(12) United States Patent
Broadbent et al.

(10) Patent No.: US 10,832,457 B2
(45) Date of Patent: *Nov. 10, 2020

(54) INTERFACE FOR DATA ANALYSIS

(71) Applicant: International Business Machines Corporation, Armonk, NY (US)

(72) Inventors: Peter R. Broadbent, Bristol (GB); Leo A. Coolen, Roermond (NL); Gregory Fitzpatrick, Feltham (GB); Franciscus J. van Ham, Geldrop (NL)

(73) Assignee: International Business Machines Corporation, Armonk, NY (US)

( * ) Notice: Subject to any disclaimer, the term of this patent is extended or adjusted under 35 U.S.C. 154(b) by 97 days.

This patent is subject to a terminal disclaimer.

(21) Appl. No.: 15/877,957

(22) Filed: Jan. 23, 2018

(65) Prior Publication Data
US 2018/0165847 A1 Jun. 14, 2018

Related U.S. Application Data

(63) Continuation of application No. 15/378,388, filed on Dec. 14, 2016, now Pat. No. 10,706,598.

(51) Int. Cl.
*G06F 3/0481* (2013.01)
*G06T 11/20* (2006.01)
*G06Q 10/06* (2012.01)

(52) U.S. Cl.
CPC .......... *G06T 11/206* (2013.01); *G06F 3/0481* (2013.01); *G06Q 10/0637* (2013.01)

(58) Field of Classification Search
CPC ...... G06T 11/206; G06F 3/0481; G06F 11/34; G06Q 10/06; G06Q 10/0637
See application file for complete search history.

(56) References Cited

U.S. PATENT DOCUMENTS

| | | | |
|---|---|---|---|
| 2007/0078625 A1* | 4/2007 | Murphy | G06F 3/023 702/176 |
| 2008/0209078 A1 | 8/2008 | Bates et al. | |
| 2009/0327852 A1 | 12/2009 | MacGregor et al. | |
| 2010/0057646 A1 | 3/2010 | Martin et al. | |
| 2013/0103677 A1* | 4/2013 | Chakra | G06F 16/248 707/723 |
| 2015/0088808 A1 | 3/2015 | Tyagi et al. | |
| 2015/0170382 A1 | 6/2015 | Bhatia | |

(Continued)

OTHER PUBLICATIONS

Analytics Canvas, "The leading Integration Tool for Google Analytics," http://analyticscanvas.com, 2016, pp. 1-11.

(Continued)

*Primary Examiner* — Arpan P. Savla
*Assistant Examiner* — Parmanand D Patel
(74) *Attorney, Agent, or Firm* — Winstead PC

(57) ABSTRACT

A method, system and computer program product for generating instances of dashboards, each dashboard instance including a set of visualizations of analytical data, relating to a collection of data. User interaction data representative of a user's actions undertaken during data exploration of the collection of data is obtained. A set of potential visualizations of analytical data relating to the collection of data is defined based on the user interaction data. At least one dashboard instance relating to the collection of data is defined based on the user interaction data and the set of potential visualizations.

9 Claims, 6 Drawing Sheets

(56) References Cited

U.S. PATENT DOCUMENTS

| | | | |
|---|---|---|---|
| 2015/0199834 A1* | 7/2015 | Gibson | H04N 19/44 |
| | | | 382/284 |
| 2015/0213506 A1* | 7/2015 | Parikh | G06Q 30/0269 |
| | | | 705/14.66 |
| 2015/0348124 A1 | 12/2015 | Conze et al. | |

OTHER PUBLICATIONS

Office Action for U.S. Appl. No. 15/378,388 dated Sep. 5, 2018, pp. 1-26.
List of IBM Patents or Patent Applications Treated as Related, Jan. 23, 2018, pp. 1-2.
Office Action for U.S. Appl. No. 15/378,388 dated Apr. 4, 2019, pp. 1-23.
Office Action for U.S. Appl. No. 15/378,388 dated Aug. 5, 2019, pp. 1-38.

* cited by examiner

INTERFACE FOR DATA ANALYSIS

TECHNICAL FIELD

The present invention relates generally to data analysis, and more particularly to the generation of instances of a user interface for data analysis (commonly referred to as a "dashboard").

BACKGROUND

Many entities use systems that rely on integrated and/or add-on analytical tools to analyze, summarize, or otherwise process large amounts of data. For example, a typical data system may include databases containing large stores of data on which a data analysis engine can execute various analytical operations. Resulting analytical data can be compiled into an analysis report according to a particular report definition. The report definition may specify any number of analytical operations to produce analytical data with specific dimensions that are presented in a specific analysis report format (e.g., level of granularity, time period, specific product groups/types presented in a tabular form).

Although a resulting analysis report may be useful to specific end users (e.g., business users), a typical user is not usually capable or interested in defining the report definition (i.e., designing and programming the necessary backend analytical operations). Indeed, most end users do not normally have the level of technical expertise necessary to easily understand resulting reports, let alone define and implement analytical operations to create their own report definitions.

To increase the usability of analysis reports and/or results, various techniques have been developed to present the analytical data to non-technical users in more easily understandable formats. For example, some systems generate analytical data that can be represented in one or more visual analytics (e.g., charts, graphs, tables, etc.) that are easily understandable by non-technical users. Based on individual needs, non-technical users can select the predetermined visual analytics to be included in customized or personalized user interface (UI) portals commonly referred to as "dashboards". Such dashboards often include graphical user interfaces (GUIs) that present users with selections (e.g. a set) of compact and succinct representations or visualizations of the visual analytics within an organized framework (e.g., a grid of framed visual analytics having to do with specific aspects of a data) that are of particular importance or relevance.

SUMMARY

In one embodiment of the present invention, a computer-implemented method for generating instances of dashboards, each dashboard instance comprising a set of visualizations of analytical data, relating to a collection of data, the method comprises obtaining user interaction data representative of a user's actions undertaken during data exploration of the collection of data. The method further comprises defining, by a processor, based on the user interaction data, a set of potential visualizations of analytical data relating to the collection of data. The method additionally comprises defining, by the processor, at least one dashboard instance relating to the collection of data, based on the user interaction data and the set of potential visualizations.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
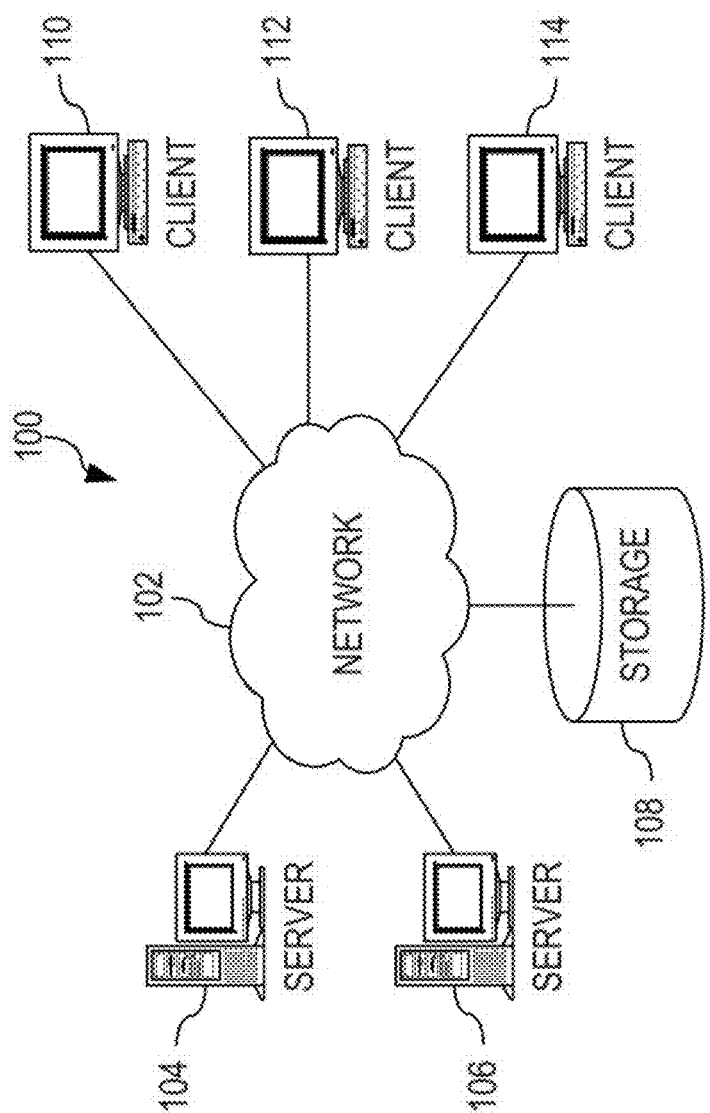
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (data processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Embodiments concern the provision of analytic data to a user for data analysis. Embodiments may therefore be utilized in a wide range of data analysis fields and/or applications (including business data analysis or medical data analysis fields/applications, for example). The following description provides a context for the description of elements and functionality of embodiments and of how elements of the embodiments may be implemented.

Proposed is a concept for generating one or more instances of a UI (e.g. dashboard) for data analysis of a collection of data (e.g. dataset or database) wherein activities, behavior or actions of user when exploring the collection of data are used to determine how analytical data may be displayed (i.e. visualized) by the UI. By analyzing how a user explores the data collection, indicators of user preferences, selections, requirements, etc. may be identified and then used to suggest potential visualizations of analytical data.

Embodiments may therefore provide an automated and efficient way to move from freeform data analysis of a database using a data discovery tool, through to the provision of dashboard instances for displaying analytical data relating to the database.

For instance, proposed concepts may enable the identification that a particular view of a data collection is deemed interesting (or relevant) to a user, and this information may be used to automatically suggest content (e.g. a specific visualization of analytical data) to be include in a dashboard for the user. In such circumstances, embodiments may be adapted to generate a dashboard instance which only displays analytical data that is pertinent to the user's needs or requirements. Visual space on dashboard may be limited, so including more relevant analytical data leads to dashboards that are better fit for purpose.

Illustrative embodiments may therefore provide concepts for analyzing a user's history in interacting with a data discovery tool and using the analysis results to populate an associated dashboard instance that acts as a summary or monitoring asset for the user. Dynamic and user-specific (e.g. personalized) dashboard instance suggestion or provision may therefore be provided by proposed embodiments.

Modifications and additional steps to traditional data analysis systems/methods may also be proposed which may enhance the value and utility of the proposed concepts.

The present invention is therefore directed toward enabling analytical data relating to a collection of data to be displayed in a manner which takes account of a user's actions or behavior when exploring the collection of data. Further, the embodiments may enable the display of such analytical data with simplicity and accurate organization while providing enough detail so that that user is facilitated to quickly and with increased efficiency and/or reliability observe patterns, values, trends, results, etc. in the collection of data. Further, embodiments may enable the provision of visual analytical data for multiple data collections and/or for multiple users in clear and efficient manner.

In the invention the following terms and definitions are used.

A graphical user interface (GUI) is a type of interface that allows users to interact with electronic devices through graphical icons, visualizations and visual indicators such as secondary notation. An example of a GUI may be dashboard, of which instances or versions may be defined by proposed embodiments. A dashboard, for the purpose of this invention, is deemed to comprise one or more visualizations.

A display device is an electronic display device that can be controlled by a display control device. The display control device can be part of, or operate together with, a processor device.

Defining the visualization of analytical data may comprise generating instructions for displaying content (e.g. analytical data) for a GUI (such as a dashboard for data analysis). Generating instructions for displaying a GUI can comprise (or be as simple as) constructing images (Bitmap, JPEG, Tiff or the like) of GUI views to be displayed on a display device using regular methods known in the art. Alternatively, such generation of instructions can comprise more dedicated instructions for real time buildup of a GUI view. The instructions can be in the form of a display control signal, and the display control signal may define a dashboard instance which comprises a set of visualizations of analytical data.

The invention is at least partly based on the insight that it is advantageous to use information about a user's history in interacting with a data discovery tool to define or control the display of one or more graphical elements of a GUI (such as a data analysis dashboard for example). In particular, one or more graphical features or aspects of the graphical elements can be defined according to user interaction data representative of a user's actions undertaken during data exploration of a collection of data. In other words, an attribute of user's interaction with a collection of data may be used to alter the appearance of graphical elements by way of altering the graphical features or aspect of a visualization.

Graphical features or aspects can be for example be chosen from the group of: spatial location/position (or relative mutual location/position in case there are multiple graphical elements) of the graphical element(s) in a GUI area, orientation, size (dimensions such as height width length and/or area size), shape (outline shape), shape fill (hatching, shading or the like), color, contrast, hue, display frequency (continuous or blinking with a specified frequency). A first graphical feature and a second graphical feature or other graphical features may be independently chosen from the above group.

The invention may thus employ the concept that the appearance of a graphical element of a GUI be determined based on an attribute of a user's interaction with a collection of data (which may, for example, be inferred or detected by a monitoring system). An instance of a data analysis dashboard may therefore be populated with graphical elements based on activities or actions undertaken by the user when undertaking data exploration of a collection of data. By way of example, a user's behavior when exploring the data collection may provide or imply information about one or more preferences, interests or requirements for analysis of the data collection, thus enabling recommendations for dashboard content to be determined. In this way, suggestions for taking the exploration activities and translating them into dashboard content may be obtained (and may even be communicated at different points during the data exploration activity).

The graphical features used in the GUI can be predefined or can be user defined. For the latter purpose, embodiments may employ a step where a user is enabled to provide graphical feature definition input using a user input device. Examples of a user input device can be one or more of the following: a keyboard, mouse or other screen pointer device, touch sensitive display screen, speech recognition device or any other means known in the art.

Figure 2:
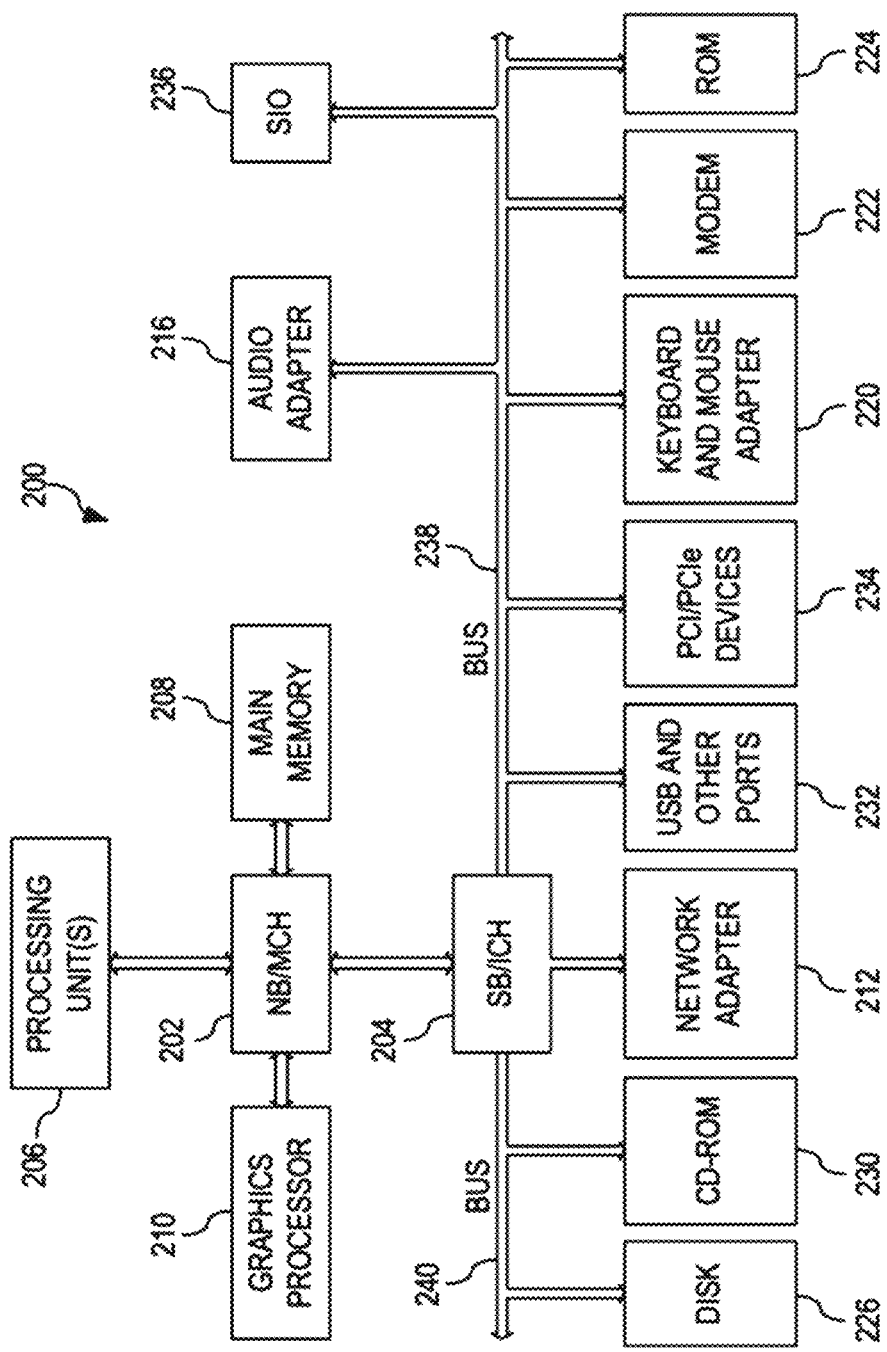
FIG. 2 is a block diagram of an example data processing system in which aspects of the illustrative embodiments may be implemented.

Illustrative embodiments may be utilized in many different types of data analysis/processing environments. In order to provide a context for the description of elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System p® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a data analysis system by suggesting or defining content for a dashboard (such as a set of potential visualizations of analytical data) that is personalized to a user without the user needing to explicitly design or program the dashboard. For example, embodiments may enable preferred analytical data and/or visualizations of analytical data to be identified and then used for defining an instance of a data analysis GUI. Such proposals can extend or improve the capabilities, usefulness or efficiency of a data analysis system or method.

Figure 3A:
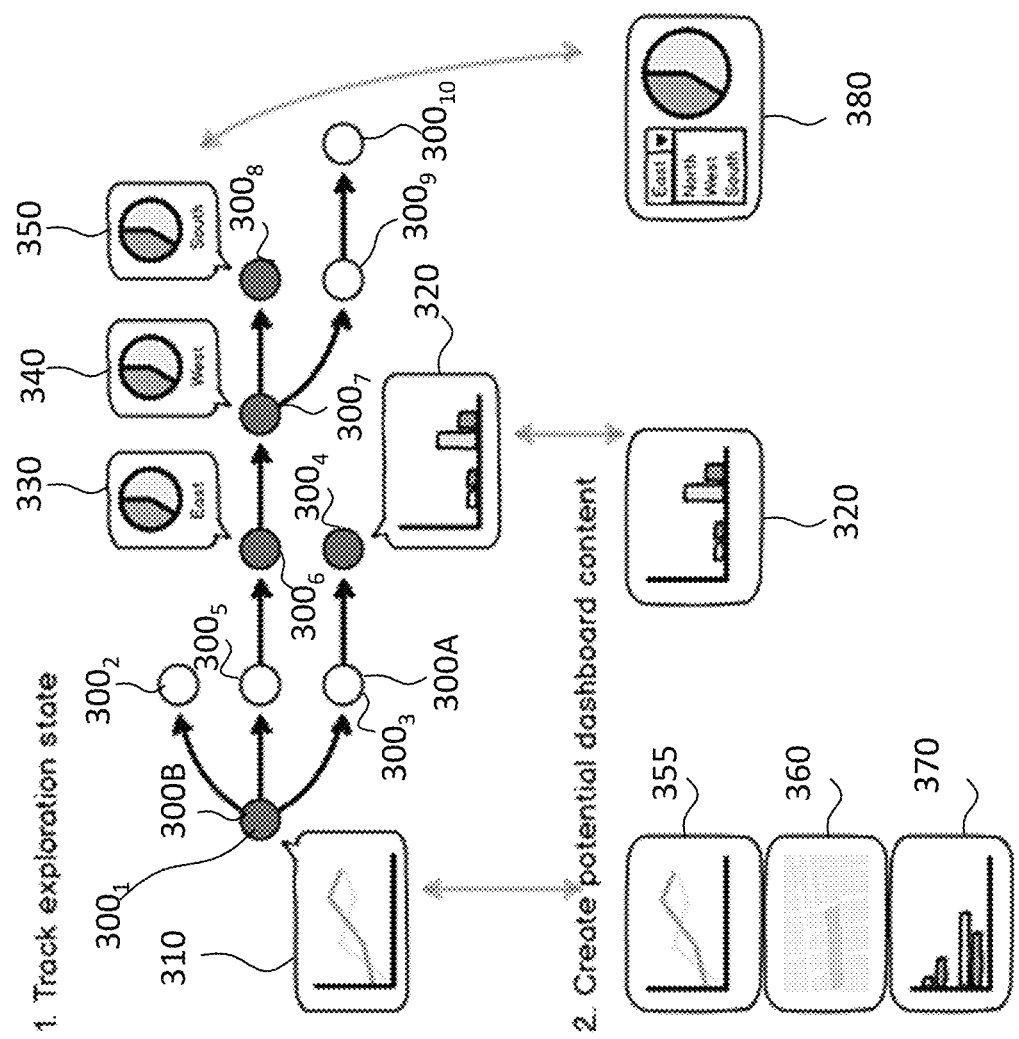
FIG. 3A is a simplified diagram illustrating first and second stages of an embodiment.

Turning now to FIG. 3, an exemplary implementation of an embodiment will now be described. More specifically, FIG. 3A depicts first 1 and second 2 stages of an embodiment. The first stage 1 comprises monitoring a data exploration process undertaken by a user so as to obtain user interaction data representative of a user's actions undertaken during the data exploration process. The second stage 2 comprises defining potential content (e.g. visualizations of analytical data) for a GUI based on the user interaction data Here, we may assume the provision of a visual data exploration tool which may be adapted to show any data projection of a given dataset (i.e. data collection) using different visualizations. A projection may comprise: a definition of the 'data projection' (e.g. the exact rollup of a specific slice of data along multiple dimensions); and a definition of the visual projection (e.g. a definition of how the data is projected into pixels onto the screen). The visual data exploration tool may therefore be thought of a freeform data exploration tool which is adapted to enable unrestricted exploration of a dataset.

Also, we may assume that the state of a given projection of data may be defined/described by an appropriate and readily-understandable description.

A data exploration process may then be described in terms of a sequence of states and the user's actions on those states. For example, referring to the illustration of Stage 1 in FIG. 3A, there is depicted a data exploration process comprising a plurality of states 300 that are represented by circles. States 300 represented by white-filled circles 300A are states which have been considered to not comprise a data visualization of interest. Conversely, states 300 represented by black-filled circles 300B are those which have been marked as having data visualizations of interest and thus include potential dashboard content.

By way of further explanation, in the data exploration process depicted in Stage 1 "Track Exploration State" of FIG. 3A, the user may begin the data exploration process in a first state $300_1$.

The first state $300_1$ may have an associated visualization of the data collection being explored. Here, the data visualization associated with the first state $300_1$ comprises a definition of the data projection (e.g. the specific slice of the data collection along multiple dimensions) and a definition of the visual projection, as illustrated by the associated graph 310.

From the first state $300_1$, the user proceeds with the data exploration process to enter a second state $300_2$. Here, the second state $300_2$ may not have an associated data visualization of interest.

The user then proceeds with the data exploration process so as to return to the first state $300_1$ and then subsequently enter a third state $300_3$. Here, the third state $300_3$ may not have an associated data visualization of interest. From the third state $300_3$, the user proceeds with the data exploration process to enter a fourth state $300_4$. The data projection associated with the fourth state $300_4$ may comprise a data visualization of interest, as illustrated by the associated graph 320.

The user then proceeds with the data exploration process so as to return back to the first state $300_1$ and then subsequently enter a fifth state $300_5$. Here, the fifth state $300_5$ may not have an associated data visualization of interest. From the fifth state $300_5$, the user proceeds with the data exploration process to enter a sixth state $300_6$. The data visualization of interest associated with the sixth state $300_6$ may comprise a definition of the data projection in the sixth state $300_6$ as illustrated by the associated pie-chart 330.

The user may then proceed with the data exploration process so as to enter a seventh state $300_7$. The data visualization of interest associated with the seventh state $300_7$ may comprise a definition of the data projection as illustrated by the associated pie chart 340.

The user may then proceed with the data exploration process so as to enter an eighth state $300_8$. The data visualization of interest associated with the eighth state $300_8$ may comprise a definition of the data projection as illustrated by the associated pie chart 350.

The user may then proceed with the data exploration process so as to return to the seventh state $300_7$ and then subsequently enter a ninth state $300_9$. Here, the ninth state $300_9$ may not have an associated data visualization of interest. From the ninth state $300_9$, the user may then proceed with the data exploration process to enter a tenth state $300_{10}$. Here, the tenth state $300_{10}$ may not have an associated data visualization of interest.

A monitoring process may continually monitor the stream/sequence of states emanating from the data exploration system, as the user interacts with it (e.g. as the user undertakes the data exploration process depicted in FIG. 3A). The monitoring process tracks both the states and the actions leading up to that state. This means that the recommendation system receives a potentially branching tree of states.

Thus, it will be understood that the monitoring process may be adapted to collect run-time statistics relating to data access events by the user during data exploration process. Such run-time statistics may be processed in accordance with an interaction inference algorithm to generate the user interaction data.

For example, whenever a state (or sequence of states) is flagged as 'interesting', the monitoring process may create a new description for a piece of potential dashboard content (e.g. a potential visualization of analytical data) to be added (as depicted in Stage 2 of FIG. 3A). For example, the data projections 310, 320, 330, 340, 350 associated with the first $310_1$, fourth $300_4$, sixth $300_6$, seventh $300_7$ and eighth $300_8$ states, respectively, may be identified as potential dashboard content or data visualizations of interest.

It is noted that there may be different rules by which new dashboard content/visualizations may be defined or generated and it may not always be the case that a single piece of explorative content (e.g. data projection) generates a single piece/fragment of dashboard content. Such rules may be based on the content of the state itself and/or the user actions leading up to that state. By way of example, the following is a non-exhaustive list:

(i) Single state to single piece of content: Whenever a user marks a particular exploration state as interesting (for example, by explicitly saving it, tagging it, or leaving it in their exploration stream for future reference), a piece of potential dashboard (such as a visualization of analytical data) representing that state may be added. Alternatively, or additionally, social information may be used to identify states of interest. For example, whenever multiple users have been in this particular state during their exploration, a piece of content representing that state may be identified as being of interest and added as potential content. In FIG. 3A, an example of a single state providing a single piece of content may be the data projection 320 associated with the fourth state $300_4$.

(ii) Multiple states collapsed into single piece of content: Whenever a user interacts with a data slice for a particular state (e.g. the monitoring system detects similar views, which only differ in the filter that has been applied) as dashboard widget with a linked list filter may be added as potential content. In FIG. 3A, an example of multiple states being collapsed to provide a single piece of content may be a compact combined data projection 380 which comprises the content of the data projections 330, 340, 350 associated with the sixth $300_6$, seventh $300_7$ and eighth $300_8$ states, respectively, (iii) Single state to multiple pieces of content: Whenever the monitoring system infers the user is particularly interested in a specific projection state (for example, the user shares it with other people), multiple projections may be generated based on the single piece of content. By way of example, this may be done either by varying the visualization projection (e.g. the visualization type), or varying the data projection (e.g. add a new dimension to an existing view). In FIG. 3A, an example of a single state being expanded to provide multiple pieces of may be data projections 355, 360, 370 which comprise the content of the data projections 310 associated with the first $300_1$ state.

Figure 3B:
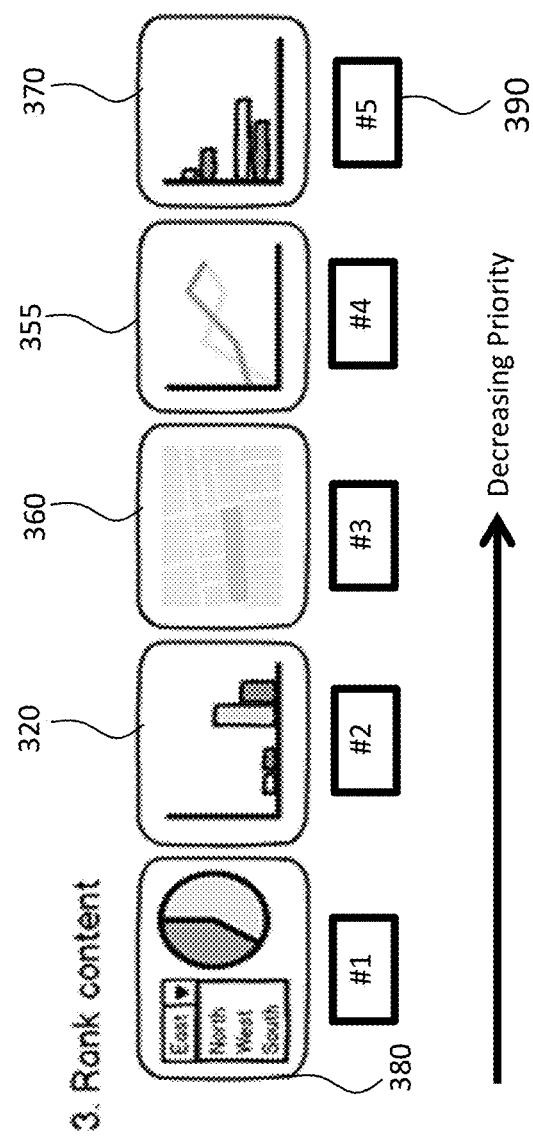
FIG. 3B illustrates a stage of ranking content from the embodiment of FIG. 3A.

Referring now to FIG. 3B, each piece of dashboard content (e.g. each potential visualization of analytical data) may be weighted based on a weighting scheme. The weighting scheme may, for example, prioritize content that is deemed more important, wherein importance may be driven by where the piece of content came from during exploration and/or how that piece was reached via the UI for example. Similarly, content that is not information dense enough may be de-prioritized (i.e. have its priority level/value reduced), for example because there's limited data visible, or because the content does not adapt well to smaller sizes. Thus, each item/visualization of dashboard content may be associated with a respective weighting value 390, and this may be based, for example, on: collected run-time statistics relating to data access events by the user during the data exploration process; one or more analytical operations (such as data queries for example) performed on the dataset to generate the analytical data; a measure of relative importance of analytical data (obtain directly from a user, and/or inferred from use actions for example); and a location of data used to generate the analytical data.

For instance, based on associated weighting values, parameters of graphical aspects of the visualizations may be defined. In this way, different items of dashboard content may be displayed/visualized differently and according to their respective weight value (e.g. respective priority). Only high-priority pieces of dashboard content (e.g. items having an associated weighting value exceeding a predetermined value) may be suggested/nominated for inclusion in a dashboard, and/or the graphical features or aspects of each piece of dashboard content may depend on its associated weighting value.

The identified dashboard content (e.g. a set of potential visualizations of analytical data) may be provided or suggested to the user. For example, this may be done various ways, including the following two options:

(i) The system may provide multiple fully assembled dashboard instances to the user. Potential dashboard instances may be generated by identifying the top-weighted content and picking the amount of content that would still match the desired dashboard characteristics in terms of screen size, and purpose. For example, rules may be implemented which specify that it is preferable to pick less content if the current screen size is small or if the current output is meant for a print medium. Other rules may state, for instance, that it is preferable to assemble content in such a way that only three or four data dimensions are visible in order to create a coherent view. Yet other (e.g. more design-based) rules may specify it is preferable not to include specific chart types.

(ii) The user may be provided with an explicit dashboard assembly mode wherein the system recommends individual pieces of content. Which content pieces are recommended for inclusion in the dashboard may be driven by weight (e.g. prioritize higher weighted content), data content (e.g. prioritize content that has links to already existing dashboard widgets) and/or visual variation (e.g. deprioritize visualizations that have already been used more than once).

From the above description of the embodiment depicted by FIGS. 3A and 3B, it will be understood that there is proposed a concept of obtaining user interaction data representative of a user's actions undertaken during data exploration of the collection of data (for example, by monitoring the user's action when using a data exploration tool/application to explore the collection of data). Based on the obtained user interaction data, one or more visualizations of analytical data relating to the collection of data may be defined (for example, by making a parameter of a graphical feature and/or analytical operation dependent on the obtained user interaction data). This collection of visualizations may then subsequently be used to define an instance of a dashboard for the user.

Figure 4:
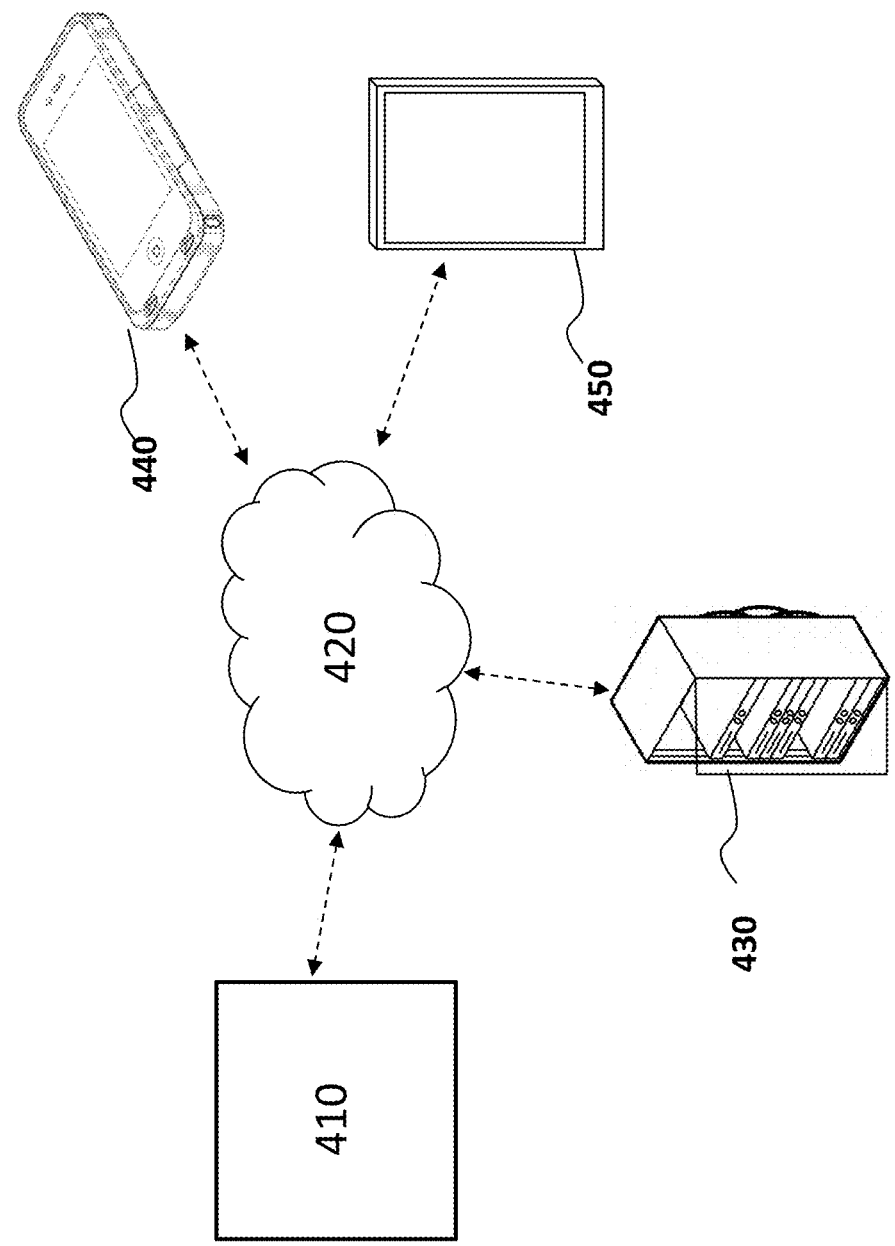
FIG. 4 is a simplified block diagram of an exemplary implementation of an embodiment.

Referring now to FIG. 4, there is depicted another embodiment of a system according to the invention comprising a control system 410 adapted to generating instructions for displaying a dashboard for data analysis on a display device. Here, the dashboard may comprise a set of visualizations of analytical data relating to a collection of data (such as one or more datasets stored by a remote data store). The control system 410 may be adapted to output one or more display control signals which are adapted to control the display of graphical elements of a dashboard (such as an instance of a data analysis dashboard).

In this embodiment, it may be described as providing the control system 410 separately from the collection of data such that it is remotely provisioned and communicates control signals to the remotely-location nodes or devices (e.g. via the internet or a wireless communication link). By way of example, the wireless connection may comprise a short-to-medium-range communication link. For the avoidance of doubt, short-to-medium-range communication link should be taken to mean a short-range or medium-range communication link having a range of up to around 100 meters. In short-range communication links designed for very short communication distances, signals typically travel from a few centimeters to several meters, whereas, in medium-range communication links designed for short to medium communication distances, signals typically travel up to 100 meters. Examples of short-range wireless communication links are ANT+, Bluetooth, Bluetooth low energy, IEEE 802.15.4, ISA100a, Infrared (IrDA), ISM Band, Near Field Communication (NFC), RFID, 6LoW-PAN, UWB, Wireless HART, Wireless HD, Wireless USB, ZigBee. Examples of medium-range communication links include Wi-Fi, Z-Wave. However, it will be understood that, in alternative embodiments, the control system 410 may be integrated within network nodes (such as a user device, data store, data server, etc.).

In this example, the control system 410 is adapted to receive information and communicate generated display control signals via the internet 420 (using a wired or wireless connection for example).

Also connected to the internet 420 (via a wired or wireless connection for example) is a remotely located data storage system 430 (such as data server). The data storage system is adapted to store a collection of data (such as one or more dataset or databases for example).

For the purpose of analyzing the collection of data, the system further comprises first 440 and second 450 mobile computing devices. Here, the first mobile computing device 440 is a mobile telephone device (such as a smartphone) with a display for displaying graphical elements of a dashboard for data analysis. The second mobile computing device 450 is a mobile computer such as a Laptop or Tablet computer with a display for displaying graphical elements of a dashboard for data analysis. Each of the first 440 and second 450 mobile computing devices are provided with a freeform data exploration tool or application which may be adapted to enable unrestricted exploration of the data collection stored by the data storage system 430.

Thus, using either of the first 440 and second 450 mobile computing devices, a user may undertake data exploration of the collection of data stored by the data storage system 430. The data storage system 430 may be adapted to cooperate with the data exploration tool or application of the mobile computing device(s) (via communication signals sent over the Internet) in order to provision a data exploration process as controlled by the user.

The control system 410 may obtain user interaction data representative of a user's actions undertaken during data exploration of the collection of data. For instance, the control system 410 may monitor usage of the data exploration tool by the user. Based on the monitored usage, the control system may then generate user interaction data. Alternatively, the data storage system 430 may be adapted to monitor user's actions undertaken during data exploration of the collection of data and to provide user interaction data (via the Internet for example).

By way of example only, the user interaction data may comprise information relating to: a user-initiated state change of the data exploration process undertaken by the user; user-initiated a sequence of states of the data exploration process; or a user-initiated indicator of interest in either data or an exploration state.

Based on the user interaction data, the control system 410 may define a set of potential visualizations (e.g. graphical representations) of analytical data relating to the collection of data based on the user interaction data. By way of example, the control system 410 may be adapted to define, based on the user interaction data; a parameter of a graphical feature of the visualizations; and/or an analytical operation on the collection of data to generate the analytical data. The control system 410 may then generate output signals representative of the defined potential visualizations. Thus, the control system 410 provides a processing resource that may obtain user interaction data representative of a user's actions undertaken during data exploration of the collection of data (e.g. by monitoring the data exploration process or by receiving such information from the data storage system 430 or mobile computing devices 440, 450) and may run one or more algorithms to transform the obtained user interaction data into descriptions of potential visualizations (e.g. graphical representations) of analytical data relating to the collection of data.

By way of further example, control system 410 may define the potential visualizations of analytical data further based on historical user interaction data relating to the user's previous actions or preferences for data exploration. For instance, previously determined user interaction data may be stored, in a historical database for example, and then used in subsequent calculations. Furthermore, currently user interaction data may be used to re-calculate or refine a previously determined visualizations or dashboard instances. Thus, a behavioral pattern of data exploration activities of the user may be stored and used in the process of defining one or more visualizations of analytical data.

The control system 410 may communicate output signals to the first 440 and/or second 450 mobile computing devices via the internet 420 (using a wired or wireless connection for example). The output signals may comprise information relating to the defined visualizations (e.g. a description of a graphical element or representation) of analytical data relating to the collection of data. In other words, the control system 410 may generate display control signals based on the defined visualizations and provide the display control signals as output signals for controlling the display of one or more visualizations of analytical data as one or more dashboard instances on a display system.

Based on the received output signals, the first 440 and second 450 mobile computing devices are adapted to display one or more graphical elements in a display area provided by their respective display. For this purpose, the first 440 and second 450 mobile computing devices each comprise a software application for processing, decrypting and/or interpreting received output signals in order to determine how to display visualizations of analytical data as one of more dashboard instances. Thus, the first 440 and second 450 mobile computing devices each comprise a processing arrangement adapted to display one or more graphical elements representative of analytical data, and to modify at least one of the size, shape, position, orientation, pulsation or color of the graphical element(s) based on the received display control signals (from the control system 410 for example).

The system can therefore communicate information about potential visualizations of analytical data to users of the first 440 and second 450 mobile computing devices. For example, each of the first 440 and second 450 mobile computing devices may be used to display one or more dashboard instances to a non-technical user, wherein the displayed dashboard instances are based on the non-technical user's actions during data exploration.

In some preferred implementations of the system, the control system 410 may be adapted to receive user feedback information based on the generate dashboard instances. Such feedback information may be stored for use in defining a subsequent visualizations of analytical data. In this way, the control system 210 may be adapted to define a potential visualizations of analytical data relating to the collection of data further based on user feedback information relating to previously defined dashboard instances or visualizations of analytical data.

Implementations of the system of FIG. 4 may vary between: (i) a situation where the control system 410 communicates a display-ready visualization of analytical data (e.g. a dashboard instance), which may for example comprise display data including graphical elements (e.g. in JPEG or other image formats) that are simply displayed to a user of a mobile computing device using conventional image or webpage display (which can be web based browser etc.); to (ii) a situation where the control system 410 communicates raw visualization information that the receiving mobile computing device then processes to determine how to display the visualizations or dashboard instances, and then displays a dashboard instance based on the determined visualization (for example, using local software running on the mobile computing device). Of course, in other implementations, the processing may be shared between the control system 410 and a receiving mobile computing device such that part of the data generated at the control system 410 is sent to the mobile computing device for further processing by local dedicated software of the mobile computing device. Embodiments may therefore employ server-side processing, client-side processing, or any combination thereof.

Further, where the control system 410 does not 'push' information (e.g. output signals), but rather communicates information in response to receiving a request, the user of a device making such a request may be required to confirm or authenticate their identity and/or security credentials in order for the information to be communicated.

It will be appreciated that all or part of a system according to an embodiment may comprise one or more data processing units. For example, the control system may be implemented using a single processor which is adapted to undertake data processing in order to define a visualization of analytical data (based on obtained user interaction data from a data exploration process/system). The control system may be remotely located from the data collection, and data representative of user interactions undertaken by a data exploration process may be communicated to the control system via a communication link.

The system may further comprise: a server device comprising the control system; and a client device comprising a display system. Dedicated data processing means may therefore be employed for the purpose of determining the visualization of analytical data based on user interaction data, thus reducing processing requirements or capabilities of other components or devices of the system.

The system may further comprise a client device, wherein the client device comprises the control system and a display system. In other words, a user (such as a care giver) may have an appropriately arranged client device (such as a laptop, tablet computer, mobile phone, PDA, etc.) which obtains and processes user interaction data in order to determine a visualization of analytical data.

Thus, processing may be hosted at a different location from where the user analyzes the collection of data. For example, for reasons of power efficiency (e.g. to improve battery lifetime) it might be advantageous to execute only part of the processing at the user location, thereby reducing associated costs, processing power, transmission requirements, etc.

Embodiments may also enable some of the processing load to be distributed throughout the system. For example, pre-processing may be undertaken at an end-user device. Alternatively, or additionally, processing could be undertaken at a communication gateway. In some embodiments, processing may be undertaken at a remote gateway or sever, thus relinquishing processing requirements from an end-user or output device. Such distribution of processing and/or hardware may allow for improved maintenance abilities (e.g. by centralizing complex or expensive hardware in a preferred location). It may also enable computational load and/or traffic to be designed or located within a networked system according to the processing capabilities available. A preferable approach may be to process user control signals locally and transmit extracted user interaction data for full processing at a remote server.

Thus, it will be understood that processing capabilities may be distributed throughout the system in different ways according to predetermined constraints and/or availability of processing resources.

Figure 5:
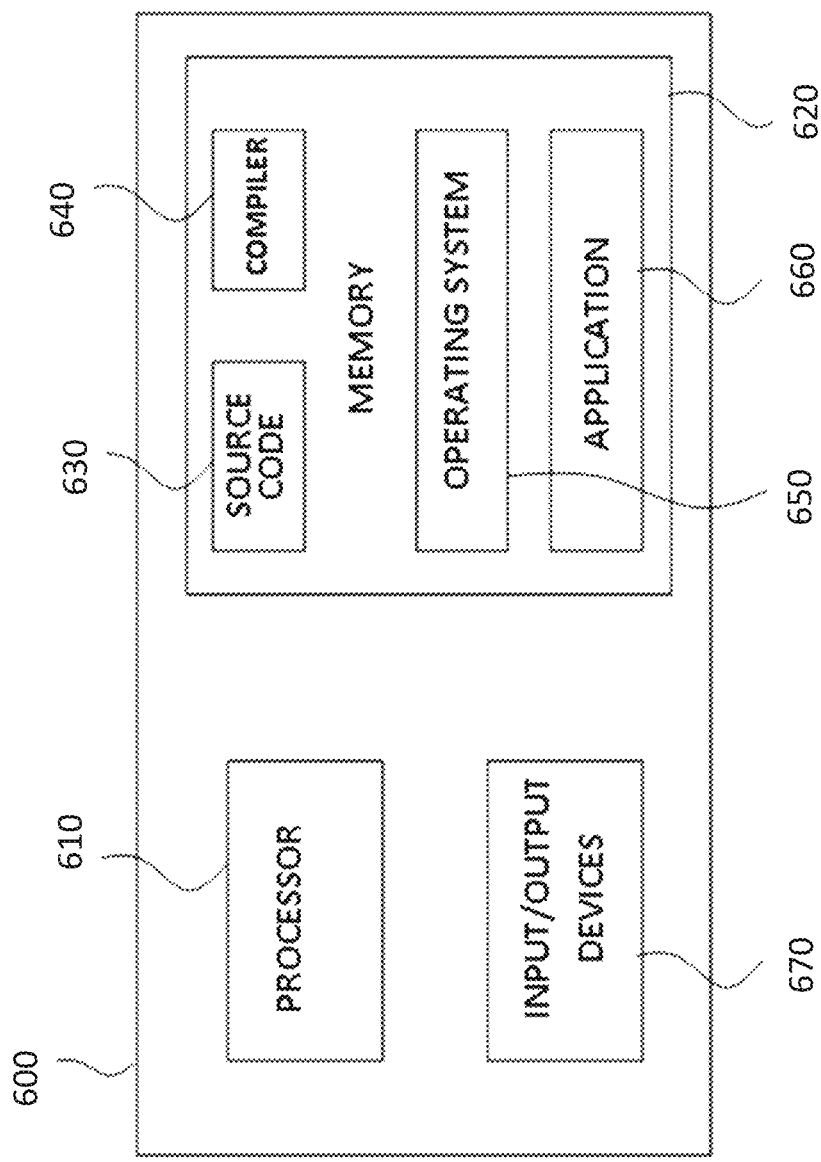
FIG. 5 is a simplified block diagram of a computer within which one or more parts of an embodiment may be employed.

FIG. 5 illustrates an example of a computer 600 within which one or more parts of an embodiment may be employed. Various operations discussed above may utilize the capabilities of the computer 600. For example, one or more parts of a system for generating instances of dashboards, each dashboard instance comprising a set of visualizations of analytical data may be incorporated in any element, module, application, and/or component discussed herein.

The computer 600 may include, but is not limited to, PCs, workstations, laptops, PDAs, palm devices, servers, storages, and the like. Generally, in terms of hardware architecture, the computer 600 may include one or more processors 610, memory 620, and one or more I/O devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a microprocessor.

The memory 620 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating instances of dashboards, each dashboard instance comprising a set of visualizations of analytical data, relating to a collection of data, the method comprising:
   obtaining user interaction data representative of a user's actions undertaken during data exploration of the collection of data comprising a dataset, wherein the user interaction data comprises two or more states of a data exploration process interacted with by the user during the data exploration;
   identifying data projections associated with the two or more states of the data exploration process interacted with by the user during the data exploration, wherein a first state and a second state of the two or more states are collapsed to provide a single piece of content corresponding to a combined data projection which comprises content of data projections associated with the first and second states of the two or more states of the data exploration process;
   creating, based on the identified data projections, a set of potential visualizations of analytical data relating to the collection of data, wherein the set of potential visualizations of analytical data comprises potential content of interest to the user to be potentially displayed in at least one dashboard instance;
   ranking potential visualizations in the set of potential visualizations of analytical data in order of priority based on a weighting scheme, wherein the weighting scheme prioritizes content based on collected run-time statistics relating to data access events by the user during the data exploration, one or more analytical operations performed on the dataset to generate the analytical data and a location of data used to generate the analytical data;
   defining the at least one dashboard instance to include one or more potential visualizations from the set of potential visualizations of analytical data based on their priority ranking; and
   presenting the at least one defined dashboard instance to the user.

2. The method as recited in claim 1, wherein the creating of the set of potential visualizations comprises:
   defining, based on the user interaction data at least one of:
      a parameter of a graphical aspect of a visualization, and
      an analytical operation on the collection of data to generate the analytical data.

3. The method as recited in claim 1, wherein the user interaction data comprises information relating to at least one of:
   a user-initiated state change of the data exploration process undertaken during the data exploration of the collection of data;

a user-initiated sequence of states of the data exploration process undertaken during the data exploration of the collection of data; and a user-initiated indicator of interest in either data or an exploration state.

4. The method as recited in claim 1, wherein the obtaining of the user interaction data comprises:

providing a data exploration tool to the user for enabling exploration of the data collection;

monitoring usage of the data exploration tool by the user; and generating user interaction data based on the monitored usage of the data exploration tool.

5. The method as recited in claim 1, wherein the creating of the set of potential visualizations relating to the collection of data is further based on historical user interaction data relating to the user's previous actions or preferences for data exploration.

6. The method as recited in claim 1, wherein the creating of the set of potential visualizations relating to the collection of data is further based on user feedback information relating to a previously defined dashboard instance of analytical data.

7. The method as recited in claim 1 further comprising:

receiving user feedback information based on the generated dashboard instance of analytical data; and storing the feedback information for use in defining a subsequent set of potential visualizations of analytical data.

8. The method as recited claim 1, wherein the defining of the least one dashboard instance comprises:

associating each of the visualizations in the set of potential visualizations with a respective weighting value based on the following: the user interaction data; an analytical operation on the collection of data to generate the analytical data; a measure of relative importance of analytical data; the location of data used to generate the analytical data; and visual constraints on the dashboard instance;

and for each of the visualizations, potentially including it on the dashboard instance based on its associated weighting value.

9. The method as recited in claim 1, wherein the of obtaining of the user interaction data comprises:

collecting the run-time statistics relating to data access events by the user during the data exploration of the collection of data; and processing the run-time statistics in accordance with an interaction inference algorithm to generate the user interaction data.

* * * * *